United States Patent
Chen et al.

(10) Patent No.: US 8,332,449 B2
(45) Date of Patent: *Dec. 11, 2012

(54) SAMPLE GENERATION METHOD AND SYSTEM FOR DIGITAL SIMULATION PROCESSES

(75) Inventors: Ernest C. Chen, San Pedro, CA (US); Paul R. Anderson, Hermosa Beach, CA (US); Joseph Santoru, Agoura Hills, CA (US); Tammy G. Liu, Lafayette, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1055 days.

This patent is subject to a terminal disclaimer.

(21) Appl. No.: 12/275,498

(22) Filed: Nov. 21, 2008

(65) Prior Publication Data

US 2009/0182796 A1 Jul. 16, 2009

Related U.S. Application Data

(63) Continuation-in-part of application No. 10/669,211, filed on Sep. 23, 2003, now Pat. No. 7,467,170.

(51) Int. Cl.
*G06F 1/02* (2006.01)

(52) U.S. Cl. ..................................................... 708/250
(58) Field of Classification Search .................. 708/250, 708/254

See application file for complete search history.

(56) References Cited

U.S. PATENT DOCUMENTS

| | | | |
|---|---|---|---|
| 4,667,301 A | 5/1987 | Chiu et al. | |
| 5,007,087 A | 4/1991 | Bernstein et al. | |
| 5,463,720 A | 10/1995 | Granger | |
| 5,515,307 A | 5/1996 | Aiello et al. | |
| 5,828,752 A | 10/1998 | Iwamura et al. | |
| 5,872,725 A | 2/1999 | Ninomiya et al. | |
| 6,097,815 A | 8/2000 | Shimada | |
| 6,141,668 A | 10/2000 | Shimada | |
| 7,000,188 B1 | 2/2006 | Eustace | |
| 7,467,170 B1 * | 12/2008 | Chen et al. | 708/250 |
| 2004/0199444 A1 | 10/2004 | Woodcock et al. | |

* cited by examiner

*Primary Examiner* — Chuong D Ngo

(57) ABSTRACT

A method for generating a set of random numbers with statistics represented by a cumulative density function includes generating a set of uniformly spaced samples between an upper limit and a lower limit. Each of the uniformly spaced samples are then mapped to a corresponding value on a cumulative density function curve. The set of uniformly spaced samples are then scrambled to randomize the samples. Companding may also be incorporated in the sample generation process.

12 Claims, 4 Drawing Sheets

SAMPLE GENERATION METHOD AND SYSTEM FOR DIGITAL SIMULATION PROCESSES

CROSS-REFERENCE TO RELATED APPLICATION

This application is a continuation-in-part of U.S. patent application Ser. No. 10/669,211, entitled "SAMPLE GENERATION METHOD AND SYSTEM FOR DIGITAL SIMULATION PROCESSES," by Ernest C. Chen, Paul R. Anderson, Joseph Santoro, and Tammy G. Liu, filed Sep. 23, 2003, now issued as U.S. Pat. No. 7,467,170, which application is hereby incorporated by reference.

TECHNICAL FIELD

The present invention relates to a method and system for generating random numbers with a specified probability density function that is faster and more efficient than current methods and system.

BACKGROUND OF THE INVENTION

Methods for generating random numbers with a specified probability density function (PDF) are well known. One such method is the Monte Carlo Method. The Monte Carlo method provides approximate solutions to a variety of mathematical problems by performing statistical sampling experiments on a computer. This can be accomplished, for example, by applying a set of sampled values to a system model implemented on a computer to generate sample results. The method applies to problems with no probabilistic content as well as to those with inherent probabilistic structure.

While the conventional Monte Carlo method is often an acceptable sampling method, it is typically accurate only after it has converged in statistics. This convergence can take a very large number of random samples to provide the desired accuracy. For example, a simulator utilizing the Monte Carlo method may include many loops (for example, "For Loops" would be used in C), nested or otherwise, to generate an accurate statistical sample with multiple random variables. Running such loops with the many iterations can take hours or days, depending on the speed of the computer or processor. Further, the amount of time may increase more than linearly with the number of samples or the number of loops required to achieve convergence. Effective random-number generation is therefore desirable.

Other prior techniques for generating random numbers with a specified PDF utilized "brute force." For example, a random number sequence uniformly distributed between 0 and 1 was first generated by calling on known system-provided routines. One difficulty with this approach is that it can take a very large amount of data before a sufficiently uniform distribution is realized depending upon application requirements. In cases where non-uniformly distributed random numbers are required, a controlled mapping was typically implemented in a conventional way to "shape" the numbers with the desired PDF. This could be done, for example, by building a lookup table, again with a brute-force mapping. This again can be extremely time consuming.

Thus, it would be desirable to provide a random number generation method that is quicker than prior methods and also reduces the number of samples that must be generated to achieve the desired statistical accuracy.

SUMMARY OF THE INVENTION

It is therefore an object of the present invention to provide a random number generation method and system that requires less time than prior methods.

It is a further object of the present invention to provide a random number method that reduces the number of samples needed to obtain a given overall accuracy for low-occurrence events.

It is still another object of the present invention to provide a random number generation system that is both systematic and efficient.

In accordance with the above and other objects of the present invention, a random number generation having a cumulative density function (CDF) is provided. (The CDF is the integral of the PDF). According to the method, a set of discrete numbers between an upper limit and a lower limit is generated. The set of discrete numbers are uniformly spaced between the upper limit and the lower limit. Each individual number from the set of random numbers is mapped to a corresponding value on a cumulative density function curve to provide a number of samples. The samples are then scrambled to randomize the order of the samples.

As an additional step, the number of samples can be subjected to companding in certain applications. The step of companding helps provide a sufficient representation of a low-probability area, while decreasing the total number of samples.

These and other features and advantages of the present invention will become apparent from the following description of the invention, when viewed in accordance with the accompanying drawings and appended claims.

BRIEF DESCRIPTION OF THE PREFERRED EMBODIMENT

The present invention is intended to allow random numbers of any distribution to be generated, such as through Monte Carlo simulation, in a significantly reduced period of time as compared to prior systems and methods. The disclosed system may be used in a lab environment with general purpose computers or may alternatively be implemented in commercial products with special-purpose processors. Moreover, the present invention may be utilized for a variety of applications for which random number generation is or can be used.

Figure 3:
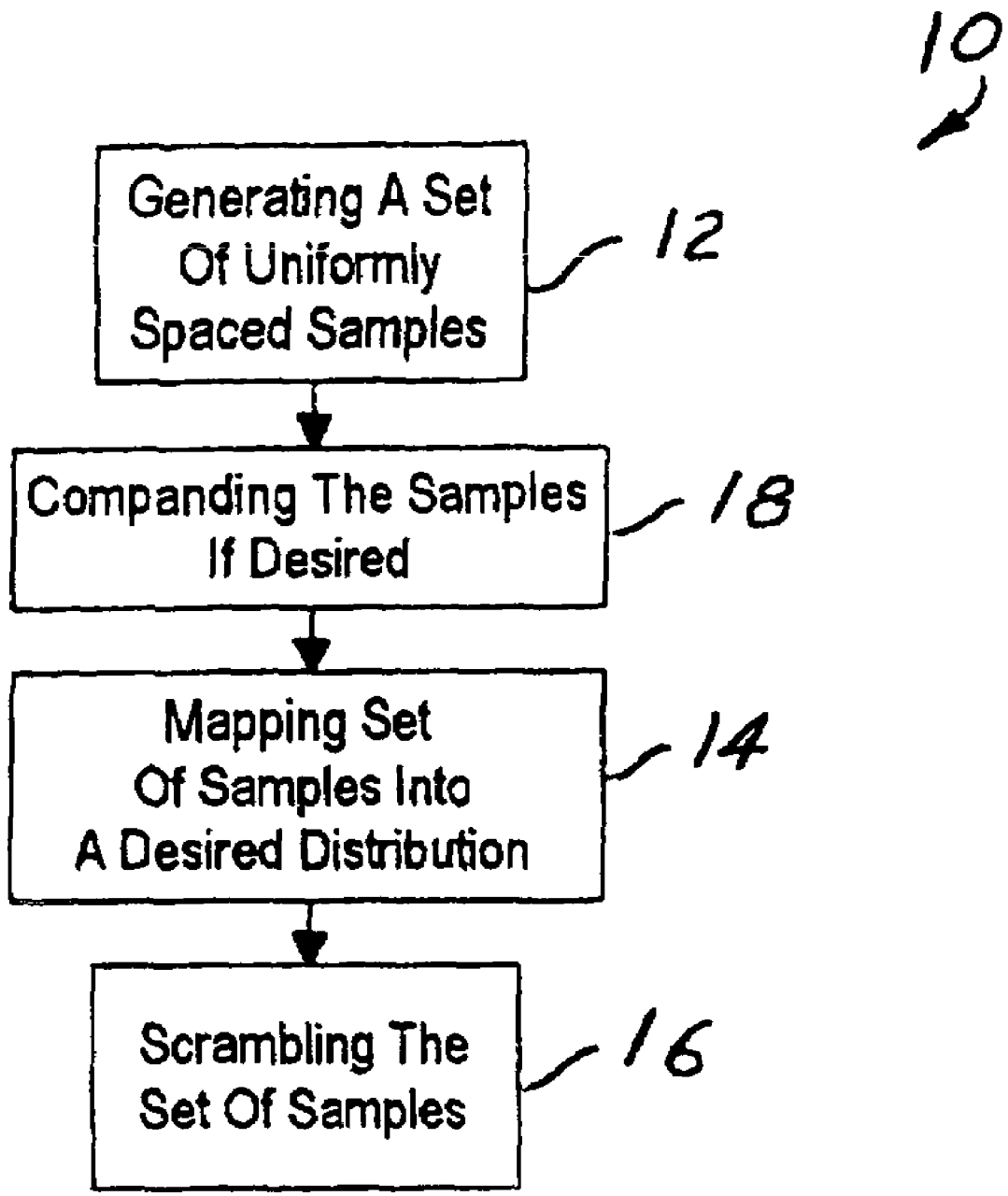
FIG. 3 is a flow chart schematically illustrating the sequence and operation of a random number generation system and method in accordance with a preferred embodiment of the present invention.

Referring now to the Figures and specifically FIG. 3, the preferred system and method 10 is preferably comprised of three components. The first component is an initial sample generation component 12, which generates numbers with immediate uniform distribution. In accordance with the number generation component 12, a set of numbers {R} having evenly spaced values between an upper numerical limit and a lower numerical limit is generated. The set of random numbers is preferably generated such that they have a uniform distribution between 0 and 1. Equivalently, instead of a uniform distribution between 0 and 1, random percentages may be generated to have a uniform distribution between 0% and 100%.

The first component of the invention, as generally indicated by reference number 12, improves distribution of random numbers by generating evenly spaced values for {R} between 0 and 1. This process provides a uniform representation across the interval of [0, 1]. It gives a smooth appearance to performance curves compiled from processing random numbers. With conventional generation methods, it would take a much larger number of samples to achieve the same curve smoothness. Alternatively, instead of generating random uniform samples for {R}, R can be replaced with an evenly spaced set of values {Y}. This provides a curve with an even smoother appearance.

Figure 1:
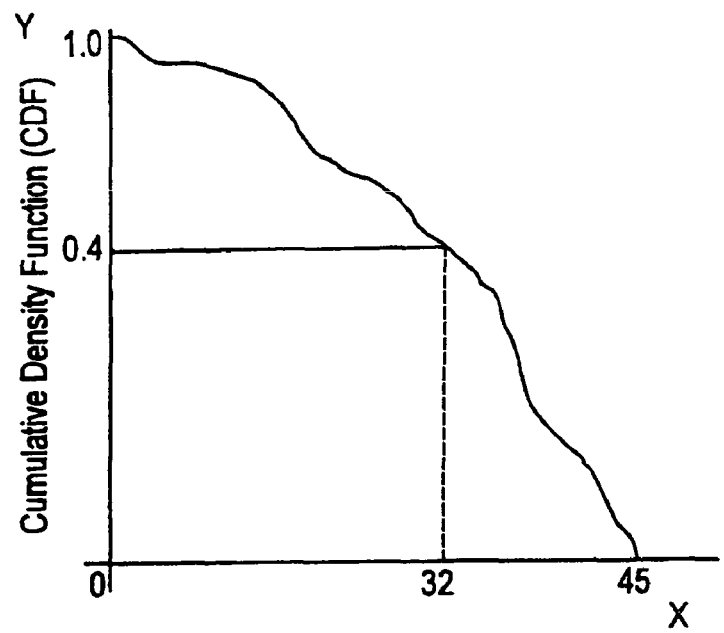
FIG. 1 is a graph schematically illustrating the mapping of uniform random numbers to generate a given cumulative density function in accordance with a preferred embodiment of the present invention.

In the second component of the invention, shown by reference number 14 of FIG. 3, thereafter, a set of values {X} are generated in ascending order with a specified PDF and a corresponding set of descending CDF values. This is accomplished through a lookup table listing X vs. Y values on the CDF curve, an illustrative example of which is shown in FIG. 1. In one embodiment, the lookup table is implemented in a computer memory and map the set {Y} to a mapped set {X}. The designator X is a random number with a CDF Y, and Y(X) is the probability that a randomly selected number from the set will be greater than or equal to X. In order to look-up the X value for a given input value $R_i$ in {R}, the conventional concept is to compare the randomly quantified number $R_i$ with members of {Y} to find the closest discrete value $Y_k$ to $R_i$ and therefore the corresponding value $X_k$. In other words, a value in the random set source set {R} is selected and mapped or looked-up on the CDF curve/table to determine the corresponding value. This process is repeated with each member of {R} to get a set of numbers with the specified CDF.

As shown in FIG. 1, the CDF starts with a numerical value of 1.0 and decreases to 0. (For our convenience and without loss of generality, this ascending order of the CDF is reversed from the normal convention, which has a CDF beginning at 0 and increasing to a numerical value of 1). By arranging {R} in a monotonic order, as automatically provided by component 12, the process of comparing $R_i$ to each sequential member of {Y}, beginning at $Y_1$, can stop at the first value $Y_k$ which is found to be less than $R_i$. This process would then be repeated for every member in {R}.

The preferred method provides a more efficient way to look up the X value for each input element in {R}. Initially, all values of {R} are arranged in, say, a descending order. Since both {Y} and {R} are in descending order, it would not be necessary to begin at $Y_1$ each time to find the nearest value in {Y}. Since the next value of R, $R_{k+1}$, is smaller than $R_k$, $Y_{k+1}$ is smaller or equal to $Y_k$. In fact, $Y_{k+1}$ is very close to $Y_k$, and the search becomes very fast. Since significantly few comparisons with candidate numbers are required, significant overall savings in processing can be achieved through utilization of the disclosed method and system. After the lookup has been completed, the order of {X} values are scrambled, as generally indicated by reference number 16. Hence, mapping each one of the generated set of numbers {R} to a corresponding mapped number to form the mapped generated set of numbers {X} can be accomplished by comparing a first number $R_1$ of the generated set of numbers {R} to the set {Y} to find the nearest value of the set {Y} to the first number $R_1$, mapping the first number $R_1$ to a first random sample value $X_1$ of the random set of sample values {X} corresponding to the nearest value of the set {Y} to the first number $R_1$, then comparing a successive number $R_{k+1}$ of the generated set of numbers {R} to a subset of the set {Y} to find the nearest value of the set {Y} to the successive number $R_{k+1}$, and mapping the successive number $R_{k+1}$ to a second random sample value $X_{k+1}$ of the random set of sample values {X} corresponding to the nearest value of the set {Y} to the first number $R_{k+1}$. The subset of {Y} may consist of values of {Y} that are smaller or equal to the nearest value of the set {Y} to the first number $R_1$, or the first value of {Y} found to be less than $R_1$. Order randomization may be achieved in one of several ways. For example, it may be done by generating a pseudo-random number (PRN) sequence {P}, which is then truncated to the length of {X} if necessary. {X} is then reordered by the elements of {P} as the latter are generated one at a time.

The first and second components of the invention may be combined as follows. First, {R} is generated by uniform stepping between 1 and 0 in descending order. The {X} values are then generated in ascending order with table lookup. The lookup process proceeds without the need for pre-sorting {R}. As set forth above, at the end of lookup, the {X} values are then scrambled. Again, scrambling is systematic and is more efficient than the brute force comparison, discussed above.

The third component of the invention, as generally indicated by reference number 18, is the companding component. In many applications, the companding improves the representation of certain regions of interest on the PDF. This concept is particularly useful for PDFs where a section of interest has a much lower probability. This means that very few points are generated in this region by the conventional method, which therefore requires a much larger number of experiment samples to guarantee a sufficient representation of the low probability section. As the required members of samples increased, the run-time may increase even more rapidly. At the same time, more than enough samples are generated for the high probability areas of the PDF and are thus "wasted." Thus, the companding component increases the representation of low-probability samples without increasing the representation high-probability samples.

Figure 2:
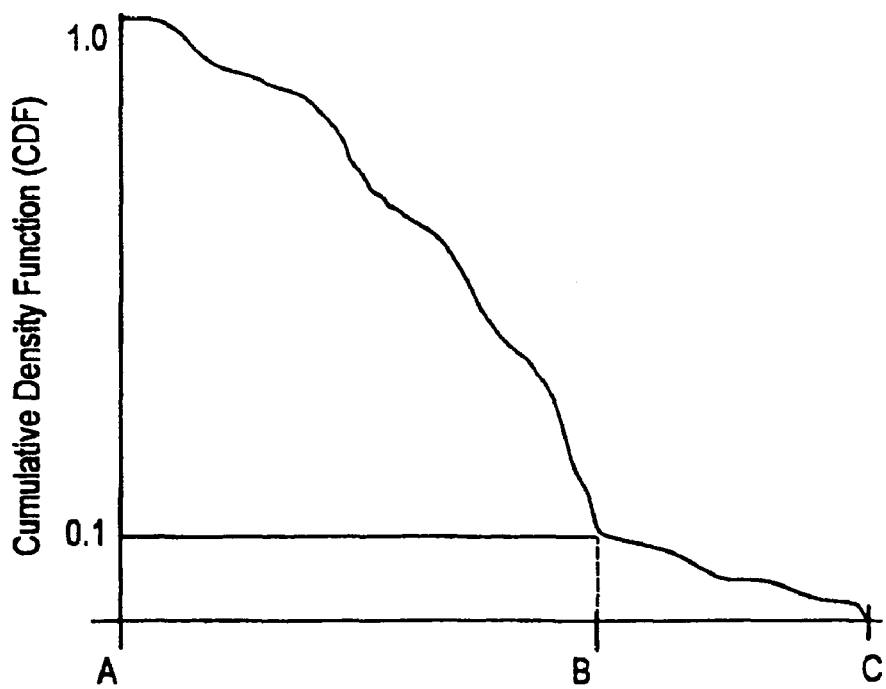
FIG. 2 is a graph schematically illustrating the identification of a low-probability area of the CDF for companding in accordance with a preferred embodiment of the present invention.

For example, a given PDF might have 90% of its events happening between A and B in FIG. 2, but only 10% between B and C. Suppose the impact of interest is from the scarce region between B and C. For each sample generated between B and C as desired, 9 samples between A and B would normally be generated as well. This is where the method of companding comes in. With companding, 10 times as many random points {R} would be generated between 0 and 0.1 of Y, as would normally be generated. This is accompanied with a corresponding reduction in the number of samples generated between the popular region between 0.1 and 1.0 of Y for a given member of total samples. After all the points are generated and statistically processed, the over-represented section is re-adjusted by dividing the probability of that section by the companding factor N. Therefore, the low-probability samples are compressed while the high-probability samples are expanded. In effect, by reducing the spacing for low probability samples, more samples are present in the low-probability area. By increasing the spacing for the high probability area, fewer samples are present in the high-probability area.

Figure 4A:
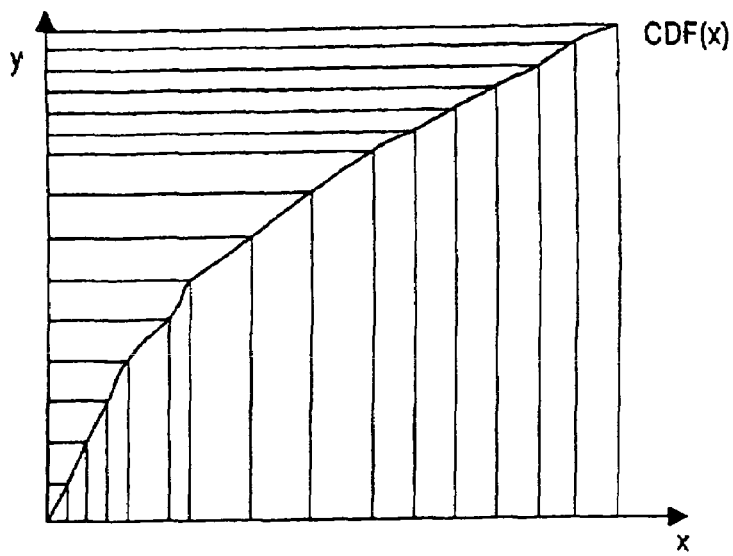
FIG. 4(a) is a graph illustrating a sample without companding.
Figure 4B:
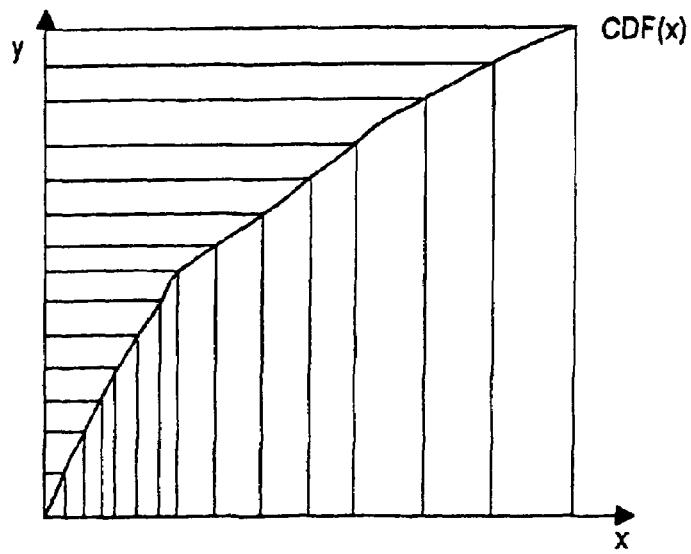
FIG. 4(b) is a graph illustrating a sample with companding.

FIGS. 4(a) and 4(b) illustrate two exemplary graphs (with CDF slopes in the conventional sense). FIG. 4(a) illustrates a sample generation without companding (Y sampling uniformly spaced). FIG. 4(b) illustrates a sample with companding. As shown by comparison of the Figures, the distribution of the samples provides a more accurate representation of the low-probability curve.

The combination of these three components provide a very efficient and accurate method and system for generating a set of random number with a given PDF.

Figure 5:
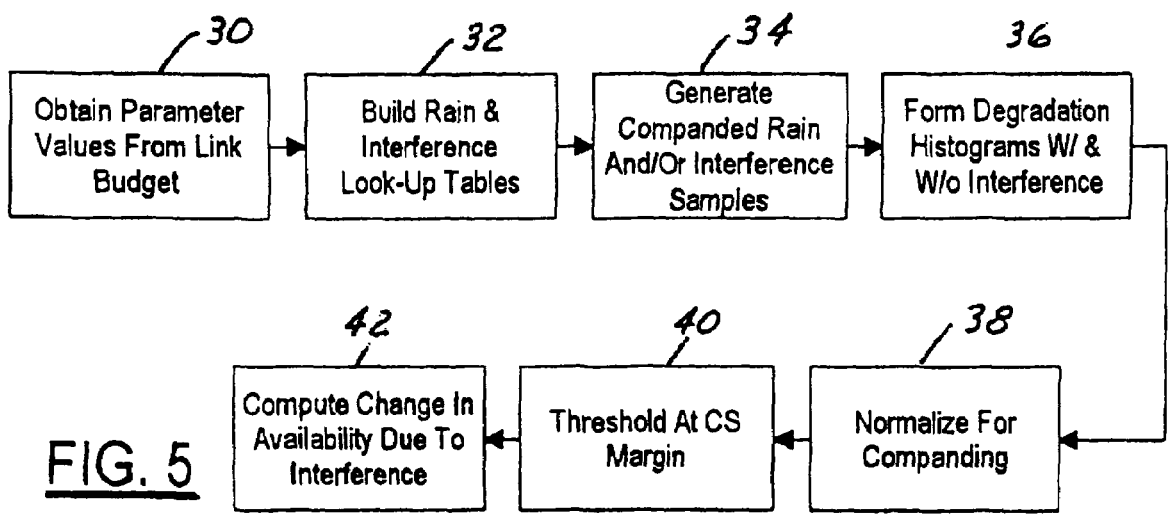
FIG. 5 is a flow chart schematically illustrating the sequence and operation of an exemplary application of a random number generation system and method in accordance with a preferred embodiment of the present invention.

Turn now to FIG. 5, which illustrates an exemplary application for the disclosed method and system. Preferred applications for the present invention include an impact analysis of rain and interference on satellite service availability. More specifically, this application allows a more thorough statistical link budget analysis when multiple statistical parameters must be analyzed. This has not previously been performed due to the huge amount of simulation that would be required to simulate interactions of the various parameters. By making such simulations feasible, the disclosed method can allow a more accurate link budget and provides better knowledge about a given system's capabilities, all with manageable computer processing time. By obtaining the total system performance statistics, worst case assumptions can be minimized. This will allow a more balanced design for optimal system performance within the limits of all resources.

Referring specifically to FIG. 5, rain and interference have been typically constant in past analysis, but can now be time varying. Thus, to determine the total impact of rain and interference, they can be combined in a Monte Carlo fashion. Initially, the parameter values from the link budget are obtained, as generally indicated by reference number 30. Thereafter, lookup tables for rain and interference impact CDFs are built, as generally indicated by reference number 32, based on a variety of factors, as will be appreciated by one of skill in the art.

Companded rain and/or an interference samples can then be generated based on the look-up tables, as generally indicated by reference number 34. Degradation histograms (PDFs) from rain with and without interference are then formed, as generally indicated by reference number 36. The histograms for these two cases are normalized for companding, as generally indicated by reference number 38. The threshold of clear sky (CS) margin is then determined at 40. Finally, the change in availability due to interference can then be determined, as generally indicated by reference number 42.

Figure 6:
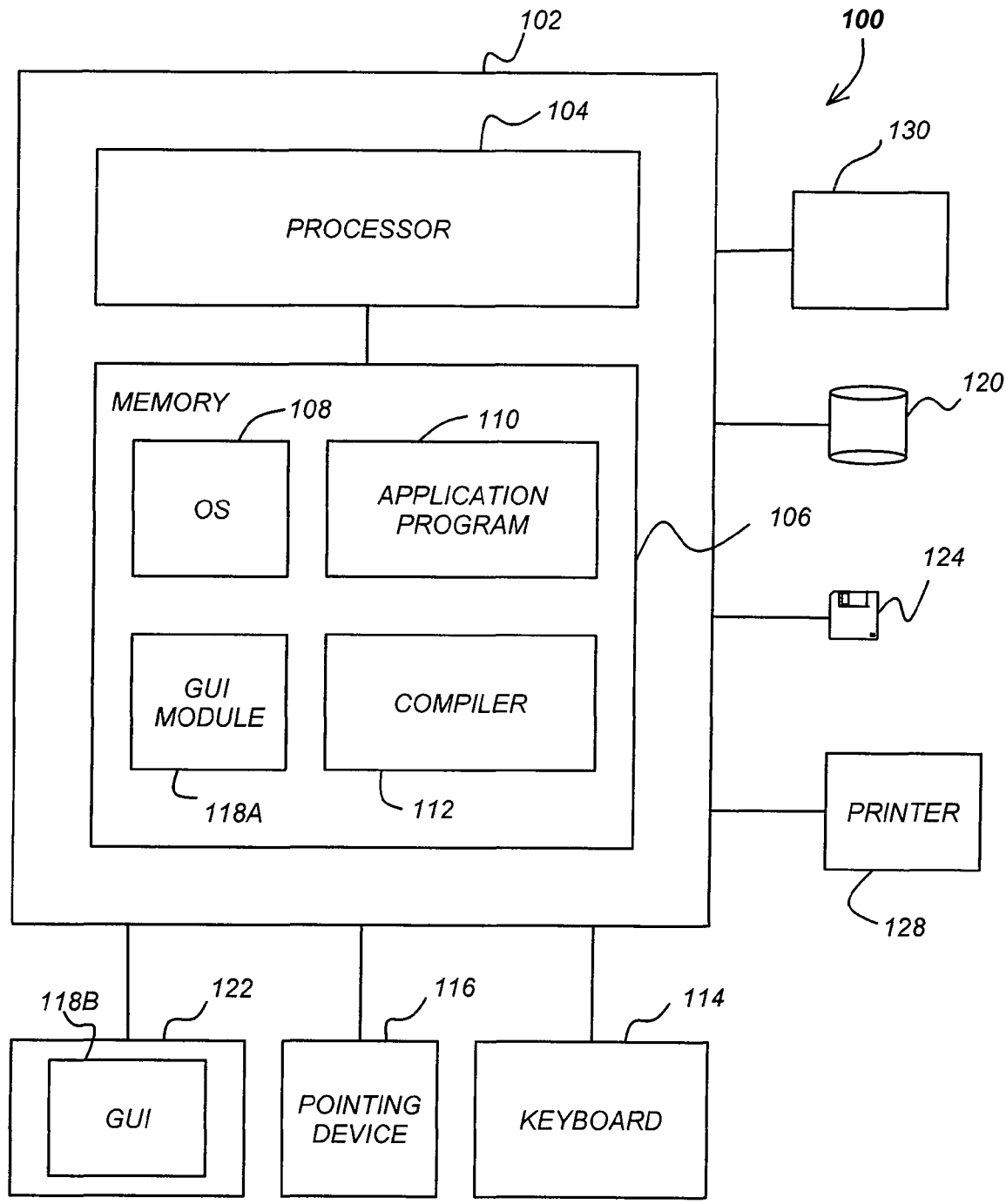
FIG. 6 is a diagram of an exemplary computer system that can be used to practice embodiments of the present invention.

FIG. 6 illustrates an exemplary computer system 100 that could be used to implement the present invention. The computer 102 comprises a processor 104 and a memory, such as random access memory (RAM) 106. The computer 102 is operatively coupled to a display 122, which presents images such as windows to the user on a graphical user interface 118B. The computer 102 may be coupled to other devices, such as a keyboard 114, a mouse device 116, a printer, etc. Of course, those skilled in the art will recognize that any combination of the above components, or any number of different components, peripherals, and other devices, may be used with the computer 102.

Generally, the computer 102 operates under control of an operating system 108 stored in the memory 106, and interfaces with the user to accept inputs and commands and to present results through a graphical user interface (GUI) module 118A. Although the GUI module 118A is depicted as a separate module, the instructions performing the GUI functions can be resident or distributed in the operating system 108, the computer program 110, or implemented with special purpose memory and processors. The computer 102 also implements a compiler 112 which allows an application program 110 written in a programming language such as COBOL, C++, FORTRAN, or other language to be translated into processor 104 readable code. After completion, the application 110 accesses and manipulates data stored in the memory 106 of the computer 102 using the relationships and logic that was generated using the compiler 112. The computer 102 also optionally comprises an external communication device such as a modem, satellite link, Ethernet card, or other device for communicating with other computers.

In one embodiment, instructions implementing the operating system 108, the computer program 110, and the compiler 112 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of instructions which, when read and executed by the computer 102, causes the computer 102 to perform the steps necessary to implement and/or use the present invention. Computer program 110 and/or operating instructions may also be tangibly embodied in memory 106 and/or data communications devices 130, thereby making a computer program product or article of manufacture according to the invention.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Having now fully described the invention, it will be apparent to one of ordinary skill in the art that many changes and modifications can be made thereto without departing from the spirit or scope of the invention as set forth herein.

What is claimed is:

1. A computer for generating and analyzing random sample values, the computer comprising a processor and a memory having instructions for performing steps comprising the steps of:
    generating a set of numbers {R}, the set of numbers {R} having evenly spaced values between an upper numerical limit and a lower numerical limit;
    mapping each one of the generated set of numbers {R} to a corresponding mapped number to form a mapped generated set of numbers {X};
    scrambling the order of the mapped generated set of numbers {X} in a substantially random manner to form a random set of sample values; and
    utilizing the random set of sample values to form a histogram-type output; and
    presenting the output on a display for statistical analysis.

2. The computer of claim 1, wherein the instructions for generating a set of numbers {R} having equally spaced values between the upper numerical limit and the lower numerical limit comprises the step of generating a monotonically ordered set of numbers between the upper numerical limit and the lower numerical limit.

3. The computer of claim 2, wherein the generated set of numbers {R} is uniformly distributed.

4. The computer of claim 3, wherein:
the memory includes a lookup table mapping a set $\{Y\}$ to the mapped generated set of numbers $\{X\}$; and
the step of mapping each one of the generated set of numbers $\{R\}$ to a corresponding mapped number to form the mapped generated set of numbers $\{X\}$ comprises the steps of
comparing a first number $R_1$ of the generated set of numbers $\{R\}$ to the set $\{Y\}$ to find the nearest value of the set $\{Y\}$ to the first number $R_1$;
mapping the first number $R_1$ to a first random sample value $X_1$ of the random set of sample values $\{X\}$ corresponding to the nearest value of the set $\{Y\}$ to the first number $R_1$;
comparing a successive number $R_{k+1}$ of the generated set of numbers $\{R\}$ to a subset of the set $\{Y\}$ to find the nearest value of the set $\{Y\}$ to the successive number $R_{k+1}$; and
mapping the successive number $R_{k+1}$ to a second random sample value $X_{k+1}$ of the random set of sample values $\{X\}$ corresponding to the nearest value of the set $\{Y\}$ to the first number $R_{k+1}$.

5. The computer of claim 4, wherein the subset of the set $\{Y\}$ consists of values of $\{Y\}$ that are smaller or equal to the nearest value of the set $\{Y\}$ to the first number $R_1$.

6. The computer of claim 5, wherein the subset of the set $\{Y\}$ consists of the first value of $\{Y\}$ found to be less than $R_1$.

7. A program storage device, readable by a computer, tangibly embodying at least one program of instructions executable by the computer to perform method steps of for generating and analyzing random sample values, the method steps comprising the steps of:
generating a set of numbers $\{R\}$, the set of numbers $\{R\}$ having evenly spaced values between an upper numerical limit and a lower numerical limit;
mapping each one of the generated set of numbers $\{R\}$ to a corresponding mapped number to form a mapped generated set of numbers $\{X\}$;
scrambling the order of the mapped generated set of numbers $\{X\}$ in a substantially random manner to form a random set of sample values; and
utilizing the random set of sample values to form a histogram-type output; and
presenting the output on a display for statistical analysis.

8. The program storage device of claim 7, wherein the method steps for generating a set of numbers $\{R\}$ having equally spaced values between the upper numerical limit and the lower numerical limit comprises the method step of generating a monotonically ordered set of numbers between the upper numerical limit and the lower numerical limit.

9. The program storage device of claim 8, wherein the generated set of numbers $\{R\}$ is uniformly distributed.

10. The program storage device of claim 9, wherein:
the computer includes a memory having a lookup table mapping a set $\{Y\}$ to the mapped generated set of numbers $\{X\}$; and
the method step of mapping each one of the generated set of numbers $\{R\}$ to a corresponding mapped number to form the mapped generated set of numbers $\{X\}$ comprises the method steps of:
comparing a first number $R_1$ of the generated set of numbers $\{R\}$ to the set $\{Y\}$ to find the nearest value of the set $\{Y\}$ to the first number $R_1$;
mapping the first number $R_1$ to a first random sample value $X_1$ of the random set of sample values $\{X\}$ corresponding to the nearest value of the set $\{Y\}$ to the first number $R_1$;
comparing a successive number $R_{k+1}$ of the generated set of numbers $\{R\}$ to a subset of the set $\{Y\}$ to find the nearest value of the set $\{Y\}$ to the successive number $R_{k+1}$; and
mapping the successive number $R_{k+1}$ to a second random sample value $X_{k+1}$ of the random set of sample values $\{X\}$ corresponding to the nearest value of the set $\{Y\}$ to the first number $R_{k+1}$.

11. The program storage device of claim 10, wherein the subset of the set $\{Y\}$ consists of values of $\{Y\}$ that are smaller or equal to the nearest value of the set $\{Y\}$ to the first number $R_1$.

12. The program storage device of claim 11, wherein the subset of the set $\{Y\}$ consists of the first value of $\{Y\}$ found to be less than $R_1$.

* * * * *